Oct. 29, 1968  O. SAHM  3,407,477
METHOD OF JOINING A ROPE CLIP TO A ROPE
Filed Oct. 18, 1965

United States Patent Office 3,407,477
Patented Oct. 29, 1968

3,407,477
METHOD OF JOINING A ROPE CLIP TO A ROPE
Otto Sahm, 8 Behringstr., 285 Bremerhaven 1, Germany
Filed Oct. 18, 1965, Ser. No. 497,029
Claims priority, application Germany, Dec. 9, 1964,
S 94,551
1 Claim. (Cl. 29—517)

ABSTRACT OF THE DISCLOSURE

An oval tubular rope clip having two parallel straight wall portions and two semi-circular wall portions is used to connect two rope parts with each other. The rope clip is inserted between a pair of separated dies, each of which has a forming cavity comprising a semi-cylindrical portion of a length longer than said clip and an adjacent semi-conical portion. One rope part is caused to extend entirely through the clip and dies and the other rope part extends only through the clip up to the semi-conical portions of the dies. When the dies are closed, they deform the clip about the rope parts into a cylindrical shape with one end of the clip being longitudinally extruded into the conical portion of said dies.

---

The invention relates to a method of joining to a rope an oval tubular rope clip with a conical portion at one end by deformation by flow extrusion in a pressing tool with one cylindrical and one conical portion.

It is well known that cylindrical rope clips for joining two portions of rope and particularly for making a rope loop at the end of a rope can be provided with a conical portion which makes the transition from the rope to the rope clip and on to the rope loop more gradual and for example prevents the rope clip from catching on a projection when the rope is coiled, which could damage the rope clip and the rope.

The blanks for making such rope clips suggested previously can only be made at considerable expense. In one known blank, for instance, the conventional, oval tube is adjacent to a portion which tapers, with a reduced wall thickness, from the oval cross-section to a circular cross-section in a conical manner. When the blank is pressed to make the rope clip, this tapered portion is given its final conical form. The shape of the swaging dies used for this purpose correspond to the shape of the blank; they have a cylindrical portion as long as the swaging dies used for making entirely cylindrical rope clips, and a conical portion for forming the tapered portion of the blank.

This type of rope clip blank has to be drop-forged, and it is clear that they can only be produced at considerable cost. Moreover, it is difficult to insert the rope end into the blank form outside through the circular opening in the conical end, which is only slightly larger than the rope. It was believed, however, that the rope would be deformed too much where it enters the rope clip if the conical portion were also formed directly by pressing from a section which was originally oval, particularly if the wall thickness in the portion of the clip which was later to be conical were not reduced from the start.

It was therefore proposed that V-shaped cuts should be made in the blank in the portion which was to be conical, these being closed when the blank was pressed. It is not, however, cheap to make these cuts in the sleeve which is otherwise oval, and also, when the sleeve is pressed, the remaining portions of material in the region which is to be conical are not swaged, at least at first, but are bent over the tip of the V. This deformation can easily cause disturbances in the structure of the material which cannot be repaired later during pressing.

It has now been found that a cylindrical rope clip with one conical end, which satisfies all requirements, can be made in a pressing tool with one cylindrical and one conical portion if, according to the invention, the blank comprises a straight-cut section of tube with a length less than the length of the cylindrical portion of the pressing tool and greater than the length of a section of tube for making an entirely cylindrical rope clip in the same tool. Surprisingly, pressing of this blank produces a rope clip in which there is no constriction of the rope in the conical portion as previously feared. Instead the material in the conical portion flows towards the end of it, and it surrounds the rope pressing firmly but harmlessly on it.

The blank, which is preferably about 5 mm. shorter than the cylindrical portion of the pressing tool, can be made very simply and cheaply from a simple section of an oval tube. The invention therefore considerably reduces the cost of a rope clip with one conical end. It is recommended that tubular sections with relatively thin walls should be used, preferably sections in which the side walls which have parallel edges in the cross-section are thicker than the semi-circular walls connecting these side walls. Normal blanks having this form of cross-section are already used for making entirely cylindrical rope clips and have given good results because they are cheaper to use and working is easy and predictable.

To illustrate the invention, the drawings contrast a new blank for a rope clip and its pressing tool with a known blank for making entirely cylindrical rope clips. In the drawings.

Figures 1, 1A:
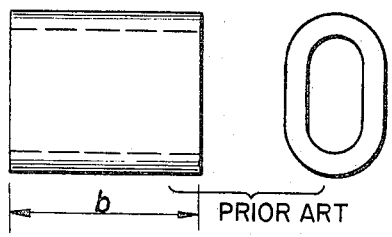
FIG. 1 is a side view of the known blank for entirely cylindrical rope clips.
FIG. 1A is an end view of a blank as shown in FIG. 1.
Figure 2:
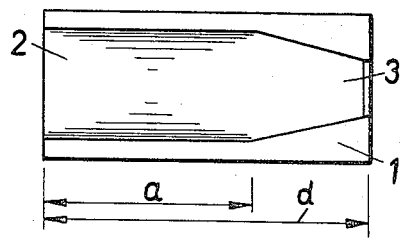
FIG. 2 is a diagrammatic plan view of one die of a known pressing tool used according to the invention.
Figures 3, 3A:
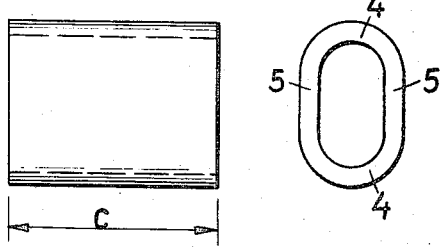
FIG. 3 is a side view of a preferred embodiment of the blank for a rope clip according to the invention.
FIG. 3A is an end view of the blank as shown in FIG. 3.

To make an entirely cylindrical rope clip in the cylindrical portion 2 of a swagging die 1 (or a corresponding, entirely cylindrical swagging die without a conical portion 3), the blanks shown in FIG. 1 must have the length $b$ which is substantially smaller than the length $a$ of the cylindrical swagging die portion 2. Compared with this, as FIG. 3 shows, the length $c$ of the rope clip blank according to the invention, which is pressed in swageing dies 1 of which one is shown in FIG. 2 to form a cylindrical rope clip with a conical projection, is considerably greater. It has been found, however, that the length $c$ must nevertheless be smaller than the length $a$. The dimensions given in the following table were found to be the most convenient lengths for various conventional rope clips, the value $d$ being the effective total length of the swagging die 1 including the conical portion.

| Rope clip No. | d (mm.) | a (mm.) | b (mm.) | c (mm.) |
|---|---|---|---|---|
| 14 | 103 | 64 | 49 | 60 |
| 16 | 117 | 75 | 56 | 70 |
| 18 | 130 | 86 | 63 | 80 |
| 20 | 145 | 95 | 70 | 90 |
| 22 | 155 | 105 | 77 | 100 |
| 24 | 170 | 115 | 84 | 110 |

A rope clip blank according to the invention preferably has the form of cross-section shown in FIG. 3, in which the two substantially semi-circular wall portions 4 are much thinner than the two parallel straight wall portions 5. The straight wall portions 5 may also conveniently be thinner than the semi-circular wall portions of the conventional clip blanks shown in FIG. 1, which are of uniform thickness all around.

When the rope or ropes are introduced into the blank only one rope must be in the portion of the rope clip which is to be conical. If for example a rope loop is being made, therefore, the rope end is not taken right back into the blank but only as far as the portion of the rope clip which will later be cylindrical.

Various steps may be taken to ensure that the rope end will be positioned correctly in the blank before pressing. For example, the operator of the pressing tool may use a rod, pushing it into the blank from the end which is to be conical up to a certain marked point depending on the size of the blank, and holding it there until the rope end, which is inserted from the other direction, comes up against the rod. Instead of the rod other means may be used, e.g. lugs of suitable length attached to the end of the rope, etc. This gives a further substantial advantage of the rope clip blank according to the invention, namely the possibility of accurate visual checking, when inserting the rope end into the blank, of whether the rope end has been inserted far enough. In the known blanks, which are given a conical portion during preliminary forging, this checking is not possible, so that at times a bore has to be made in the blanks for reasons of safety.

Figure 4:
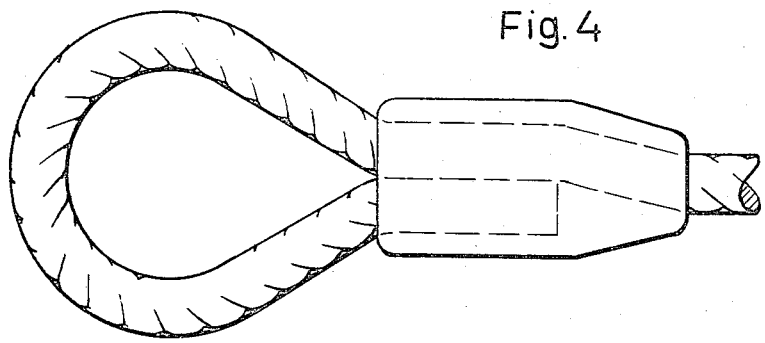
FIG. 4 shows a finished rope clip made according to the invention.

FIG. 4 shows a rope clip made from the new blank according to the invention, after pressing. The end product is basically the same as the known cylindrical rope clips with a conical portion at one end, but its advantages are very much more easily and cheaply obtained by means of the invention.

What I claim is:

1. The method of joining rope parts comprising the steps of inserting the rope parts to be joined into an oval tubular rope clip having two parallel straight wall portions and two semi-circular wall portions connected with said straight wall portions, inserting said clip into a pressing tool comprising a pair of separated dies each of which has a forming cavity, said cavity comprising a semi-cylindrical portion of a length longer than said clip, and an adjacent semi-conical portion which is of shorter length than said semi-cylindrical portion, one of said rope parts being inserted so as to extend entirely through said clip and also through both said semi-cylindrical portion and said semi-conical portion of said dies, while the other rope part being only inserted into said clip so as to terminate at the point where said semi-cylindrical portion merges into said semi-conical portion, and then closing said separated pressing dies so as to deform said clip about said rope parts into a cylindrical shape with one end of said clip being longitudinally extruded into the conical portion of said dies to form a conical portion on one end of said clip.

References Cited

UNITED STATES PATENTS 2,476,731    7/1949    Hobbs.
3,242,545    3/1966    Sahm _____ 24—123

FOREIGN PATENTS 718,602    11/1954    Great Britain.
1,232,990    10/1960    France.
1,323,286    2/1963    France.

CHARLIE T. MOON, *Primary Examiner.*